(No Model.) 2 Sheets—Sheet 1.
H. C. STIFEL.
WATER FILTER.
No. 582,399. Patented May 11, 1897.
Fig. I.
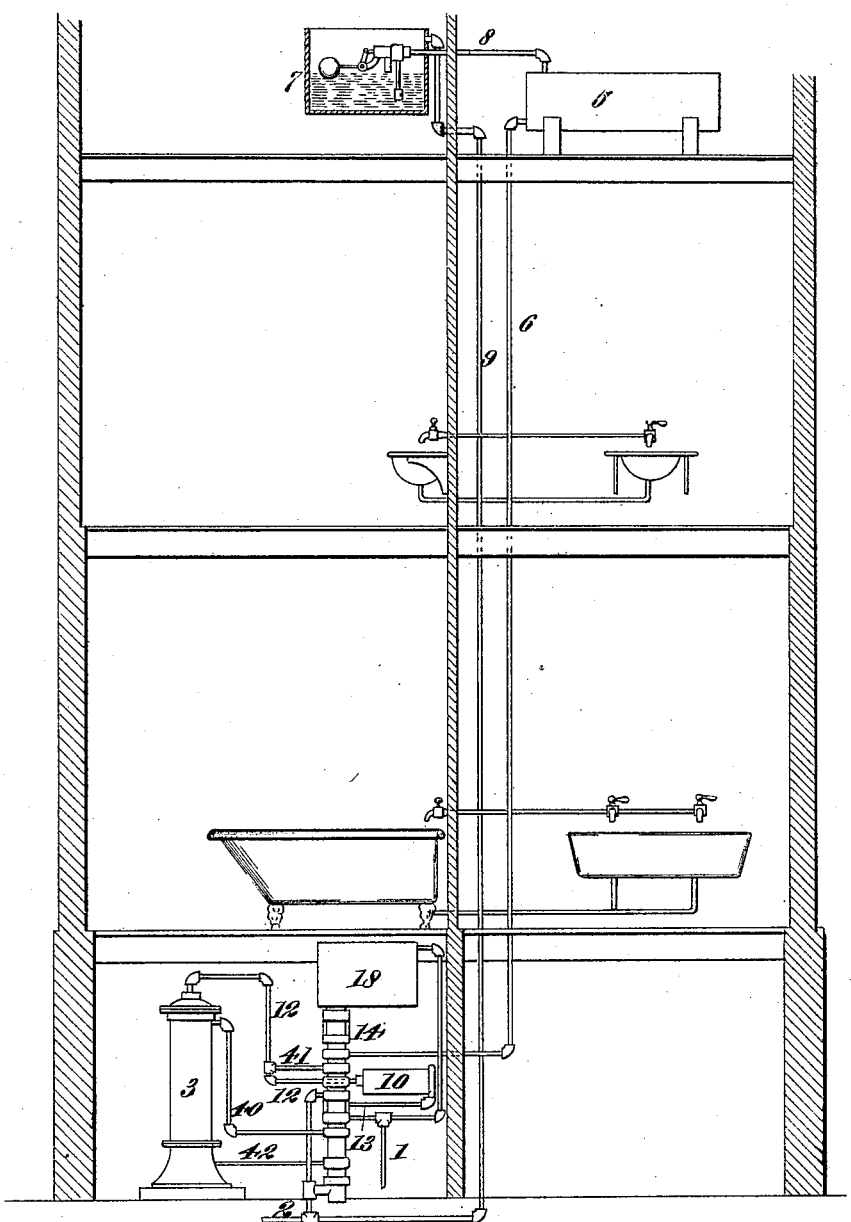
Attest:
C. G. Edwards.
A. W. Eberwld.
Inventor:
Herman C. Stifel
By Knight Bro.
Attys

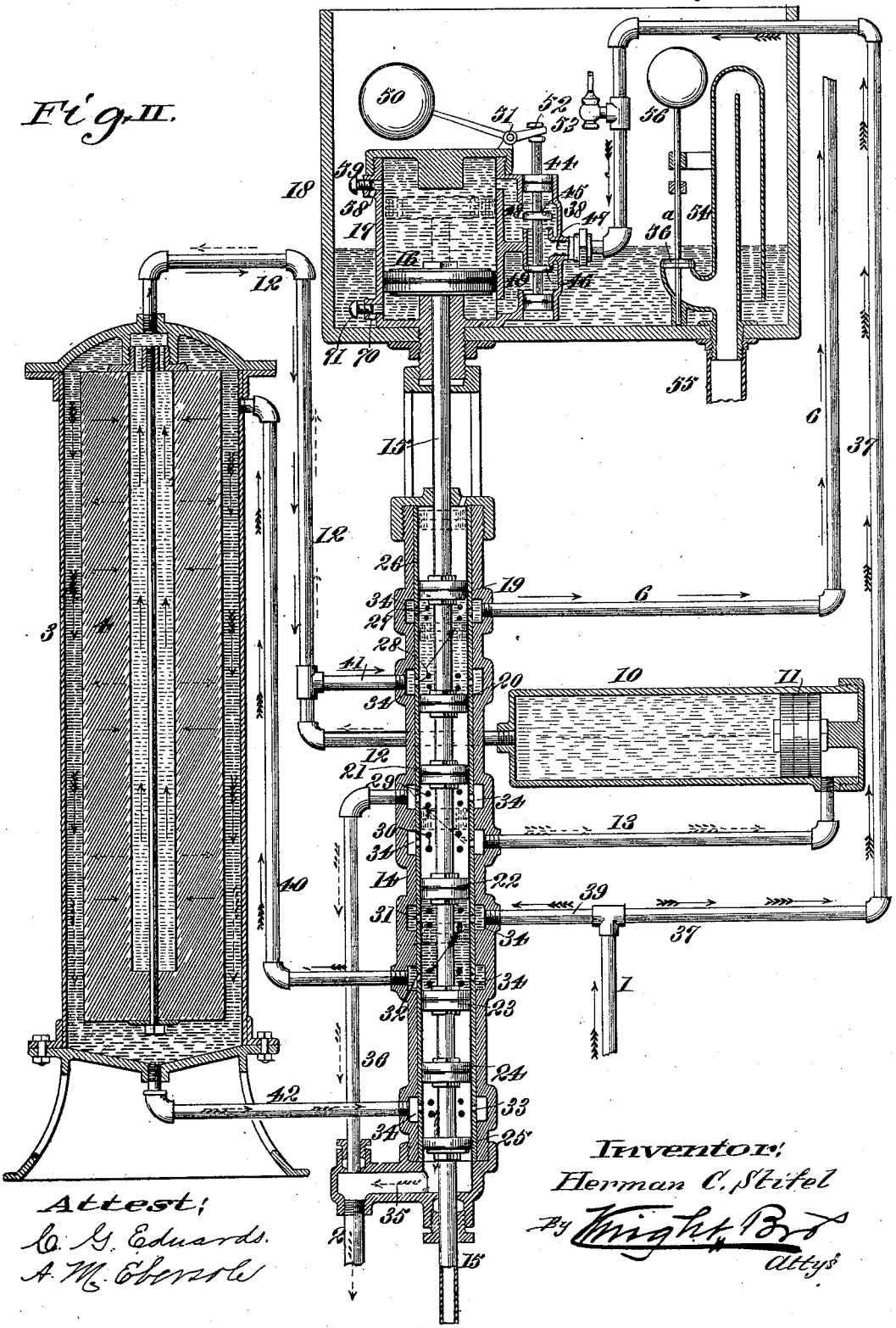

UNITED STATES PATENT OFFICE.

HERMAN C. STIFEL, OF ST. LOUIS, MISSOURI, ASSIGNOR, BY MESNE ASSIGNMENTS, TO THE AMERICAN TRIPOLI COMPANY, OF CARTHAGE, MISSOURI.

WATER-FILTER.

SPECIFICATION forming part of Letters Patent No. 582,399, dated May 11, 1897.

Application filed March 5, 1894. Serial No. 502,350. (No model.)

*To all whom it may concern:*

Be it known that I, HERMAN C. STIFEL, of the city of St. Louis, in the State of Missouri, have invented a certain new and useful Improvement in Water-Filters, of which the following is a full, clear, and exact description, reference being had to the accompanying drawings, forming part of this specification.

My invention relates to an improved apparatus for filtering water, whereby, through means of what I term an "automatic valve device," water under pressure from the main supply is at intervals forced back through the filtering stone or body to clean it.

My invention consists in features of novelty hereinafter fully described, and pointed out in the claims.

Figure I is an elevation illustrative of my improved apparatus. Fig. II is an enlarged vertical section of the filter, the valve device, and adjacent parts.

Referring to the drawings, 1 represents the supply-pipe, extending from the city main or other source of supply, and 2 a discharge-pipe extending to the sewer or other place of deposit.

3 represents the filter-tank, within which is located the filtering stone or body 4.

5 is the clear-water storage-tank, and 6 the pipe leading to the storage-tank.

7 represents a tank communicating with the tank 5 by means of a pipe 8 and which communicates with the discharge-pipe 2 through means of a pipe 9. The construction, function, and operation of the tank 7, with its connections and accessories, are fully shown and described in my application filed February 26, 1894, Serial No. 501,566, and they form no part of my present invention.

10 represents a clear-water cylinder having a loose piston 11 and which communicates with the interior of the filtering stone or body 4 through means of a pipe 12, as in my application referred to.

13 represents a pipe forming a communication between pipe 1, through the valve device, and the end of the cylinder 10 remote from pipe 12, so that when water is admitted from the main supply through the pipe 13 and forces the piston 11 forward toward the pipe 12 the water in the cylinder 10 will be forced through the pipe 12 and out through the filtering-body, as illustrated by the dotted arrows.

In my application referred to water was admitted from the main supply to the cylinder 10, behind the piston 11, by the manipulation of a hand valve or cock, whereas with my present invention this is done automatically and at intervals.

The valve device consists of a cylinder or tube 14, traversed by a stem 15 on a piston 16, located in a cylinder or housing 17, which in turn is located within a tank or box 18. The stem 15 is provided with cup-leathers 19, 20, 21, 22, 23, 24, and 25. Within the tube 14 is a sleeve 26, having perforations 27, 28, 29, 30, 31, 32, and 33, and at each set of these perforations the tube 14 is provided with an annular chamber or groove 34. The lower end of the tube 14 communicates with the pipe 2 through means of a hollow lateral extension 35, and this extension communicates with the chamber 34 of the perforations 29 through means of a pipe 36. The pipe 13 communicates with the chamber 34 of the perforations 30.

37 represents an extension of the supply-pipe 1 and which forms a communication between the supply-pipe and the valve-chest 38 of the cylinder or housing 17. The pipe 37 has a branch 39 extending to the chamber 34 of the perforations 31.

40 is a pipe forming a communication between the chamber 34 of the perforations 32 and the upper part of the tank 3, and through which the water to be filtered is discharged into the tank 3 outside of the filtering stone or body 4. The pipe 12 communicates with the chamber 34 of the perforations 28 through means of a branch 41.

The pipe 6 from the storage-tank connects with the chamber 34 of the perforations 27.

42 represents a pipe forming a communication between the bottom of the filtering-tank 3 and the chamber 34 of the perforations 33.

44 represents a stem extending into the valve-chest 38 and having thereon a valve 45 and also a valve 46, the valve 45 being adapted to close the upper end of a passage-way 47 within the chest and with which the pipe 37 communicates and the valve 46 being adapted to close the lower end of this passage-way.

48 represents a passage-way between the valve-chest and the upper part of the cylinder 17, and 49 represents a passage-way between the valve-chest and the lower part of the cylinder 17.

50 represents a float located within the tank 18, and the stem of which is pivoted at 51 to the cylinder 17 and engages at 52 with the upper end of the stem 44.

53 represents a valve or cock in the pipe 37, and from which the water is allowed to escape continuously into the tank 18.

54 represents an ordinary form of siphon located within the tank 18, and with which communicates a pipe 55, leading to any suitable place of discharge. The siphon 54 is provided with a float 56 and valve 56ª, by which the siphon is started when the water in the tank reaches and raises the float.

The operation of the device is as follows: Water from the pipe 1 passes through the branch 39, through the perforations 31 and 32, through the pipe 40, and into the tank 3 outside of the filtering body or block 4, a small portion of the water passing at the same time through the pipe 37 and through the cock 53 and opening 58, hereinafter referred to, into the tank 18. The water that passes through the pipe 40 percolates through the filtering stone or body 4 and through the pipe 12 and branch 41, through the perforations 28 and 27, and through the pipe 6 to the storage-tank, a small portion of the water passing also through the pipe 12 into the cylinder 10 and forcing the piston 11 into the position shown in Fig. II. The water will continue to thus pass until the water in the tank 18 reaches and raises the float 50. This will cause the valve 45 on the stem 44 to be seated and the valve 46 to be opened, and the water from the pipe 37 will then pass beneath the piston 16 and raise the piston and all of the cup-leathers on the stem 15 to the position shown by dotted lines in Fig. II, the water escaping from above the piston 16 through a vent 58, which may be regulated by a set-screw 59, so as to control the speed with which the piston and cup-leathers rise or move. When the piston and cup-leathers are thus moved to the position shown by dotted lines, water will pass from the pipe 1 and branch 39, through the perforations 31 and 30, and through the pipe 13 to the cylinder 10, behind the piston 11, and will force the piston forward, discharging the clear water therein through the pipe 12 into the hollow filtering stone or body, from where it passes out through the pores of the stone or body, as shown by the dotted arrows, cleaning the latter of sediment and dirt therein and on the surface, the water passing from the tank 3 at this time through the pipe 42, through the perforations 33, and through the extension 35 and waste-pipe 2.

When in its upper position, the cup-leather 24 preferably closes only the lower set or series of perforations 32, so that while the water is passing back through the filtering body or stone 4 a small amount of water is also passing from the main supply through the upper series of these perforations 32 and through the pipe 40 into the tank 3, and thus while there is a flow of water back through the filtering body or stone there is also a flow of water down around the outside of the stone, effecting a thorough cleansing of the stone and tank.

While the piston 16 and cup-leathers are in this upper position, the pipe 6, leading to the storage-tank, will be shut off, as well as the branch 41, leading from the pipe 12. While the piston 16 and cup-leathers are thus in their upper position, the water continues to drip through the cock or valve 53 until it reaches and raises the float 56, until it opens the valve 56ª, and then the water will commence to flow from the tank 18 through the siphon 54, and as the water is lowered in the tank 18 the float 50 falls, opening the valve 45 and closing the valve 46. The piston 16 then commences to descend, the water escaping from beneath the piston 16 through a vent 70, the size of which may be regulated by a set-screw 71. When the piston reaches its lower position, the cup-leathers on the stem 15 are all in their normal positions (shown by full lines in Fig. II) and the operation first described is resumed, the piston 11 being forced back to the position shown in Fig. II by water passing through the pipe 12, and as it is forced back the water escapes from behind it through the pipe 13, through the perforations 30 and 29, and through the pipe 36 to the pipe 2. The water continues to fall in the tank 18 until it reaches the mouth of the short leg of the siphon 54, when the action of the siphon will be broken and the tank will then commence to fill again and the operation just described is repeated, when the water in the tank again reaches and raises the float 50. Thus the filtering stone or body 4 is intermittently being washed out or cleansed by clear filtered water under the force of the main supply, although the unfiltered water from the main supply is not utilized to clean the filtering stone or body, and does not reach the filtering stone or body from the inside, this being done by means of the filtered and clean water in the cylinder 10.

In the drawings the course of the unfiltered water is shown by full arrows, the course of the filtered water is shown by featherless arrows, and the course of the clean-out water is shown by dotted arrows.

I do not wish to be limited to a cylinder 10 with its piston 11, as some other form of device containing clear water might be used for this purpose.

I claim as my invention—

1. A filter provided with a valve device, containing means whereby it is automatically operated, a device for containing clear water, a supply-pipe communicating with said device containing clear water through said valve device, whereby the valve device and device containing clear water are operated automatically at predetermined intervals, by the hydrostatic pressure in the supply-pipe, substantially as set forth.

2. In a water-filtering apparatus, the combination of a filter, a water-cylinder having a piston and with which the filter connects, a supply-pipe, and an automatically-operated valve device controlling a communication between the supply-pipe and the water-cylinder, substantially as and for the purpose set forth.

3. In a water-filtering apparatus, the combination of a filter, a water-cylinder having a piston and with which the filter connects, a supply-pipe, and an automatic valve device controlling a communication between the supply-pipe and the water-cylinder; substantially as and for the purpose set forth.

4. In a water-filtering apparatus, the combination of a filter, a device for containing water with which the filter connects, a supply-pipe, and an automatically-operated valve device controlling a communication between the supply-pipe and the device containing water; substantially as and for the purpose set forth.

5. In a water-filtering apparatus, the combination of a filter, a device for containing clear water with which the filter connects, a supply-pipe, a valve device controlling a communication between the supply-pipe and the device containing clear water, and a communication between the valve device and the filter, outside of the filtering-stone, whereby clear water under the supply-pressure is made to pass outwardly through the stone and at the same time a small portion of water is permitted to pass from the supply-pipe to the filter outside of the stone; substantially as and for the purpose set forth.

6. In a water-filtering apparatus, the combination of a filter, a device for containing clear water with which the filter communicates, a supply-pipe, a valve device controlling a communication between the supply-pipe and the device containing clear water, a communication between the valve device and the filter outside of the filtering-stone, and a communication between the valve device and the filter inside of the filtering-stone; substantially as and for the purpose set forth.

7. In a water-filtering apparatus, the combination of a filter, a device for containing clear water with which the filter communicates, a supply-pipe, a valve device controlling a communication between the supply-pipe and the device containing clear water, a pipe forming a communication between the valve device and the filter outside of the filtering-stone, a pipe and branch forming a communication between the valve device and the filter inside of the filtering-stone, and a pipe forming a communication between the valve device and the bottom of the filter outside of the filtering-stone; substantially as and for the purpose set forth.

8. In a water-filtering apparatus, the combination of a filter, a device for containing clear water with which the filter communicates, a supply-pipe, a valve device controlling a communication between the supply-pipe and the device containing clear water, a storage-tank, a pipe forming a communication between the valve device and the storage-tank, a pipe and branch forming a communication between the valve device and the filter inside of the filtering-stone, a pipe forming a communication between the valve device and the filter outside the filtering-stone, and a pipe forming a communication between the valve device and the bottom of the filter outside of the filtering-stone; substantially as and for the purpose set forth.

9. In a water-filtering apparatus, the combination of a filter, a cylinder adapted to contain clear water and having a piston, a clear-water pipe forming a communication between the cylinder and the filter inside of the filtering-stone, a valve device controlling communication between the supply-pipe and said cylinder, a branch forming a communication between the valve device and said clear-water pipe, a pipe forming a communication between the valve device and the filter outside of the filtering-stone, and a pipe forming a communication between the valve device and the bottom of the filter outside of the filtering-stone; substantially as and for the purpose set forth.

10. In a water-filtering apparatus, the combination of a filter, a cylinder having a piston, a pipe forming a communication between the cylinder and the filter inside of the filtering-stone, a valve device controlling the communication between the supply-pipe and said cylinder, a waste-pipe, and a pipe forming a communication between the valve device and the waste-pipe; substantially as and for the purpose set forth.

11. In a water-filtering apparatus, the combination of a filter, a clear-water cylinder having a piston, a pipe forming a communication between the clear-water cylinder and the filter inside of the filtering-stone, a supply-pipe, a valve device forming a communication between the supply-pipe and said cylinder, a pipe forming a communication between the valve device and the filter outside of the filtering-stone, a storage-tank, a pipe forming a communication between the valve device and the storage-tank, a cut-off tank, a pipe forming a communication between the supply-pipe and the cut-off tank, a cylinder located within the cut-off tank and containing a piston for moving said valve device, a chest communicating with said last-mentioned cylinder and with which said supply-pipe communicates, valves located in said chest, a float connected to the stem of said valves, a drip-cock located in said last-mentioned pipe, a siphon and a float-valve controlling the siphon; substantially as and for the purpose set forth.

12. In a water-filtering apparatus, the combination of a filter, a clear-water cylinder having a piston, a pipe forming a communication between the clear-water cylinder and the filter, a supply-pipe, and a valve device located between the supply-pipe and the clear-water cylinder; said valve device consisting essentially of a tube containing a perforated sleeve and a valve-stem provided with cup-leathers; substantially as and for the purpose set forth.

13. In combination with a self-cleaning filter, having means for intermittently directing backflow of clear water through the filtering medium to cleanse the same; a water-forcing device operated by hydrostatic pressure of the supply and intermittently-operating automatic mechanism also actuated by the pressure of the water-supply controlling the communication of the supply-pressure to said water-forcing device for effecting such backflow at predetermined intervals, as explained.

HERMAN C. STIFEL.

In presence of—
C. G. EDWARDS,
A. M. EBERSOLE.